G. J. McCLOSKY.
CONTROL MECHANISM FOR MOTOR VEHICLES.
APPLICATION FILED MAR 28, 1918.
1,299,748.
Patented Apr. 8, 1919.
3 SHEETS—SHEET 2.
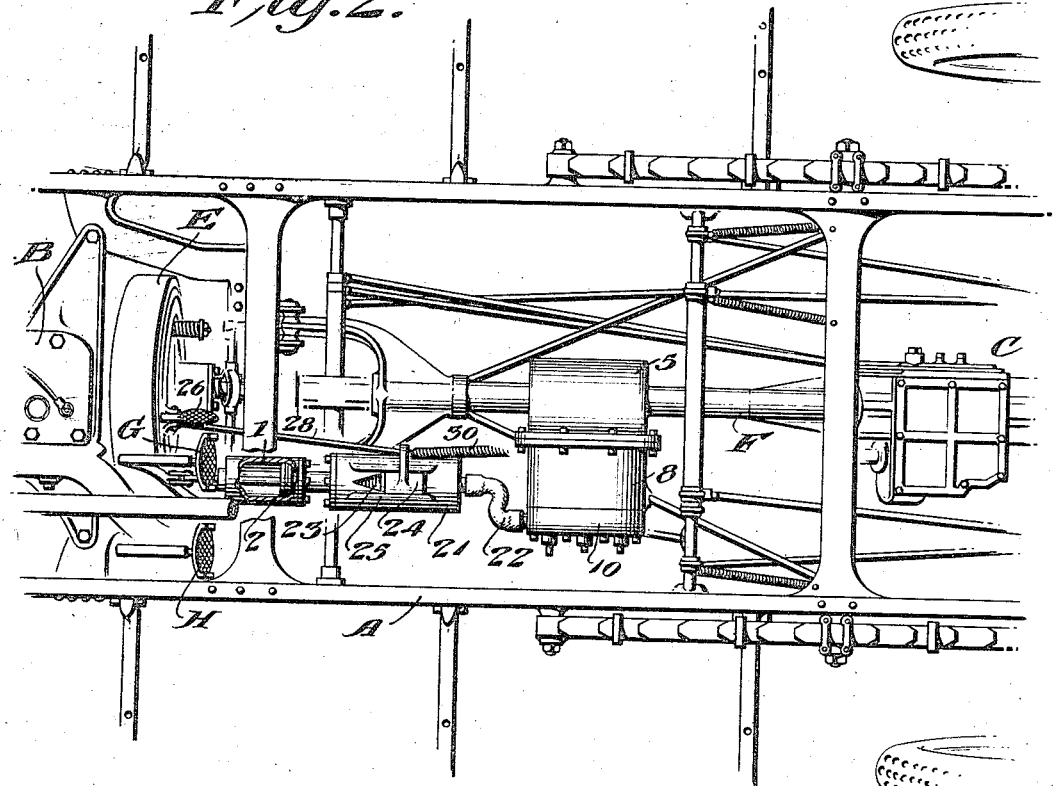
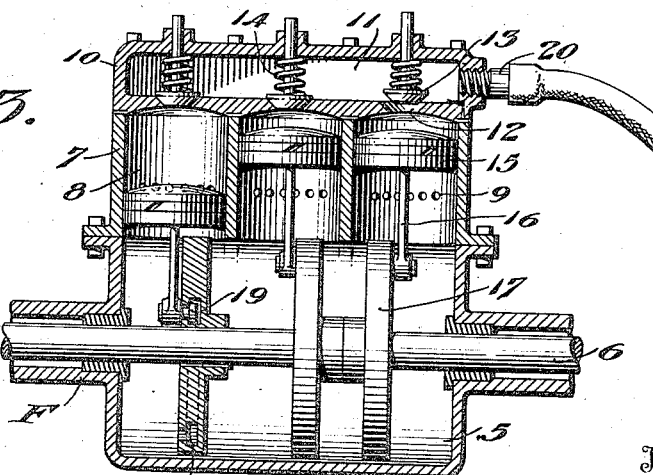
Inventor
George J. McClosky
By Lloyd W. Patch
Attorney Inventor
George J. McClosky
By Lloyd W. Patch
Attorney

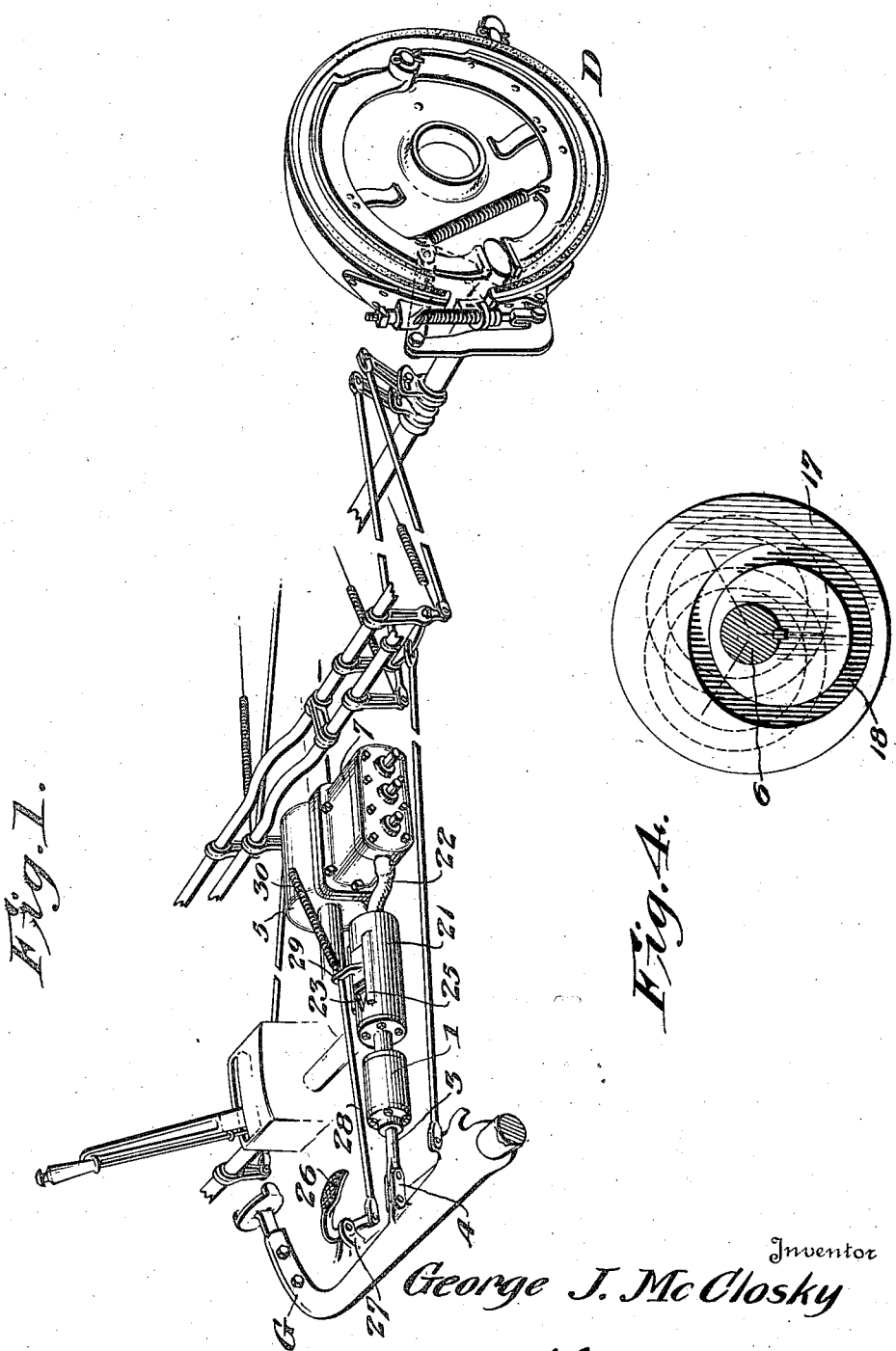

UNITED STATES PATENT OFFICE.

GEORGE J. McCLOSKY, OF WASHINGTON, DISTRICT OF COLUMBIA.

CONTROL MECHANISM FOR MOTOR-VEHICLES.

1,299,748.                    Specification of Letters Patent.        Patented Apr. 8, 1919.

Application filed March 28, 1918.   Serial No. 225,290.

*To all whom it may concern:*

Be it known that I, GEORGE J. McCLOSKY, a citizen of the United States, residing at Washington, in the District of Columbia, have invented new and useful Improvements in Control Mechanism for Motor-Vehicles, of which the following is a specification.

This invention relates to a control mechanism for motor vehicles, and particularly to a mechanism of this character adapted for use in conjunction with an automobile and constructed to accomplish operative movement of the brakes or clutch, or both, by the use of fluid pressure.

An object of my invention is to provide a mechanism which can be fitted to a machine already in use or can be built into the automobile at the factory, and which has the parts thereof so constructed and arranged that the operation of the usual brake and clutch pedals by foot pressure is in no way interfered with.

A further object lies in constructing the mechanism, and coupling the same up with the usual brake and clutch means to secure the shifting movement of the same immediately the air or operating fluid is confined under pressure, the control for the air being of such character that a sharp or a gradual operation of these parts can be accomplished.

Another object is to provide air compressing means which generates a continuous supply of fluid under pressure, and to then arrange piston operating means for the brake or clutch pedals, or both, with manually controlled fluid confining means between the pressure generating mechanism and the piston operating means.

A still further object resides in arranging the air compressing mechanism to receive operating power from the main drive shaft of the vehicle or from some other shaft which is continuously revolved when the vehicle is in use, and to so arrange this means that the working load is evenly distributed.

With the above and other objects in view, which will be understood from the specification, drawings, and claims, my invention consists in certain novel features of construction and combinations of parts which will be hereinafter more fully set forth.

In the drawings:

Figure 1 is a perspective view illustrating the brake structure of an automobile with the device of my invention applied thereto.

Fig. 2 is a plan view of the middle portion of the chassis of a vehicle to better illustrate the arrangement of the several parts with respect to the standard structure of the vehicle.

Fig. 3 is a sectional view taken longitudinally through the air compressing means.

Fig. 4 is a sectional view through the drive shaft showing the arrangement of operating cams for the compressor.

Figure 5:
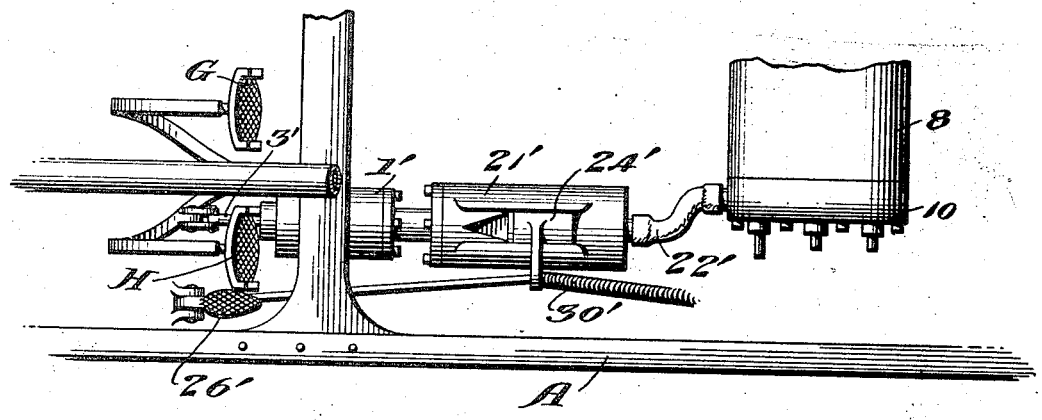
Fig. 5 is a fragmentary plan view illustrating the application of the invention to operate the clutch pedal.

In the drawings I have shown the structure as embodied with the parts of an automobile of standard or usual construction, and as here illustrated the frame A has the engine or power plant B carried at the forward end thereof, while the transmission, C, is carried at the rear end of the frame. A power connection is established from the transmission to the driving wheels in any approved manner, and brake structure, generally indicated at D, and which is also of usual construction is provided for the driving wheels. A clutch E is associated with the power plant, and a shaft journaled in the housing F establishes a connection from the clutch to the transmission C. The usual brake and clutch pedals G and H are provided at points to be conveniently accessible to the operator of the vehicle, and operating connections are made from these pedals to the parts to be actuated thereby.

In Figs. 1 and 2 I have illustrated the adaptation of the invention for operation of the foot brakes alone of the vehicle, and as here shown, the cylinder 1 is carried by the frame structure in horizontal disposition and with its length extending in line with the length of the frame, the cylinder being disposed in alinement with the bent stem of the brake pedal G. A piston 2 mounted slidably within the cylinder 1 has the piston rod 3 thereof connected by links 4 with the brake pedal G, and thus as the piston is moved within the cylinder to extend the rod therefrom, the pedal G will be depressed and through the connection of the rods to the brakes, the brakes D will be set in the usual manner. When the cylinder 1 is free of fluid under pressure, the piston 2 will move without hindrance therein, and the manual operation of the foot brakes is in no way affected.

While various means might be employed to supply compressed air to the cylinder 1 for fluid operation of the brakes, it is desirable that compressed air be constantly available during the operation of the vehicle, to meet which condition an air compressor constructed substantially as illustrated in Fig. 3 is provided. This air compressor includes the case 5 formed as a part of the housing F and disposed around the middle portion of the drive shaft 6, journaled in the housing. The case 5 is open at one side and a casting 7, which is bored to form cylinders 8, is secured to the case over the open side thereof. This casting has intake openings 9 formed therethrough at the side to communicate with the cylinder bores 8, and a casting 10 having a chamber 11 therein, is secured on the casting 7 to close the cylinder bores at their head ends. This casting 10 has outlet openings 12, which are formed as valve seats, provided through the inner wall thereof to establish communication from the chamber 11 to the cylinder bores 8, and valves 13 are mounted to close within these seat-like openings 12 to check against backflow to the cylinders, springs 14 being provided to resiliently hold the valves in closed positions. Pistons 15, provided with the usual rings, are mounted in the several cylinder bores 8, and have pitmen rods 16 connected therewith.

The disks 17, of which one is provided for each of the pistons, are mounted on the shaft 6 within the case 5, and are fixed by keys or other suitable means to turn with the shaft. Each of the disks 17 has an annular groove 18 formed in one face thereof eccentrically around the shaft 6, these grooves 18 being substantially T-shaped in cross section, as shown in Fig. 3. Rollers 19 are carried by the free ends of the pitmen rods 16 and work within the grooves of the cam disks 17. As shown in Fig. 4, the several disks are fixed on the shaft 6 with the grooves thereof balanced around the shaft, and thus as the shaft is turned and the pistons 15 are carried in reciprocatory movement within the cylinders the working load upon the shaft will be evenly distributed. The intake openings 9 are so located that on their instrokes the pistons 15 will just clear them, the openings being closed during the outstroke, and thus a very efficient air compressor mechanism is provided. The compressed air is supplied the chamber 11, and a nipple 20 provides an outlet from this chamber.

With the compressor structure as described, atmospheric air is being constantly compressed during the entire time that shaft 6 is rotated, and it will of course be understood that a direct connection to the cylinder 1, from the outlet nipple 20, is impractical, as with this arrangement pressure would be constantly maintained against the piston 2 to shove down the brake pedal G. To overcome this difficulty I provide an air cylinder 21, which is connected with cylinder 1 at the inner end thereof, and is in turn connected by a flexible tube 22 with the discharge nipple 20. This air cylinder 21 has an outlet opening 23 at one side thereof, and a slide 24, mounted in guides 25, is proportioned to close or partly close over the opening 23. A foot pedal 26 is mounted by bearing 27 at a point to be conveniently accessible to the operator of the vehicle, and a connecting rod 28, attached at one end to the foot pedal is connected at its free end with a bracket arm 29 on the slide plate 24.

The opening 23 can be made of triangular form and finest adjustments of the air pressure to the cylinder 1 through cutting off of the escape by closing down the opening 23, can be attained, or this opening might be of any other form. A spring 30 acts to normally move the plate 24 to a position in which the opening 23 is uncovered, and it will of course be understood that through the usual brake structure and the springs associated therewith, the pedal G will be normally held in a raised position, in which the brakes are released. The cylinder 1, and the air cylinder 21, are preferably fixedly mounted on the supporting frame structure, while the air compressor structure is carried by the housing F, which is movable with respect to the supporting frame, and it is for this reason that the flexible tube or hose 22 is employed to establish an air conducting connection.

In the use of the structure, the parts will be embodied in a motor vehicle and connected with the brakes and with the drive shaft in substantially the manner set forth, this installation being made as the machine is manufactured, or the device as an attachment, being applied to machines already in use. As the shaft 6 is rotated, the compressor structure is continuously operated, and thus air under pressure is constantly supplied to the air cylinder 21, escape from this cylinder, however, being provided for through opening 23. The spring 30 normally resiliently forces the slide plate 24 to a position in which the opening 23 is left unobstructed, and even though the compressor structure be constantly operated, the load imposed on the shaft 6 is negligible, thus avoiding interference with the operation of the vehicle. When the brakes are to be set, the foot pedal can be depressed in the usual way, or when the brakes are to be set by air pressure, the pedal 26 will be depressed to move the slide plate 24 sufficiently that the opening 23 is obstructed. The degree to which the opening is closed will determine the amount of air retained in the air cylinder 21, and consequently the air pressure exerted against piston 2. When the slide plate 24 has been moved sufficiently, air under pressure will be confined within the air cylinder 21 and will be supplied to cylinder 1 to act against the piston therein, and to consequently move the foot pedal G. This movement of the foot pedal is substantially identical with the movement under foot pressure, and the brakes will be set in the usual manner, however, only sufficient force need be exerted upon the pedal 26 to overcome the tension of the spring 30, and thus the brakes may be applied with much less exertion on the part of the operator.

Immediately the foot pedal 26 is released, the spring 30 will again move the slide plate 24 to the position in which the opening 23 is uncovered, and, as the pressure against the piston 2 is relieved, the brake pedal G will be raised and the brake structure will be released.

With the adaptation as illustrated in Fig. 5, the arrangement of the parts is substantially the same as shown in Figs. 1 and 2, with the exception that the cylinder 1′ and the air cylinder 21′ are located to bring the piston rod 3′ in line with the arm of the clutch pedal H, connection being established from the piston rod to the arm of this pedal instead of pedal G. An operating pedal 26′, corresponding to the pedal 26, is provided adjacent the clutch pedal H, suitable operating connections being provided to accomplish movement of the slide plate 24′, and a spring 30′ being connected to normally hold this plate in a position in which the opening of the cylinder 21′ is uncovered. A flexible tube or hose 22′ establishes an air conducting connection from the compressor structure.

Figure 6:
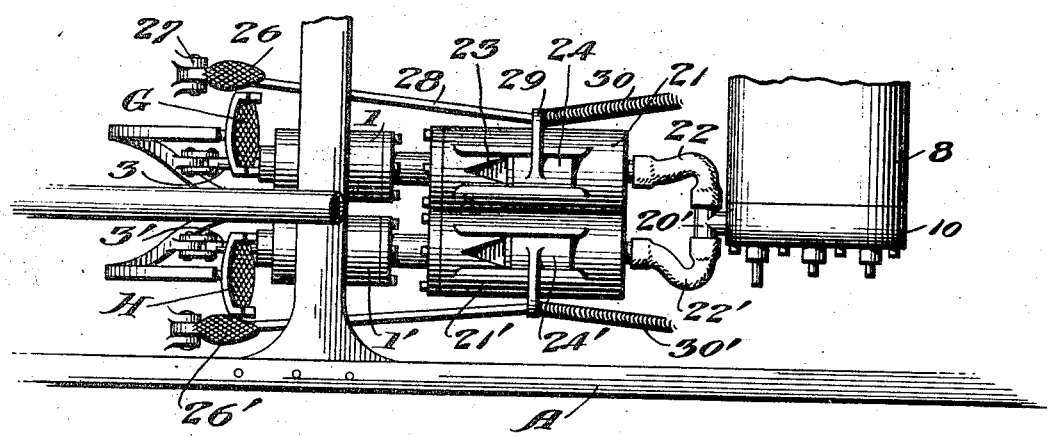
Fig. 6 is a view similar to Fig. 5 showing the arrangement and the connection of the parts for operation of both the brake and the clutch pedals.

In Fig. 6 I have illustrated an adaptation of the invention which is substantially an embodiment of the structure shown in Figs. 2 and 5, in combination upon a single vehicle. A T-head nipple 20′ is connected in communication with the chamber 11 of the compressor, and tubes 22 and 22′ connect with the branches of this nipple and lead to the air cylinders 21 and 21′. The remaining parts of the structure are identical with the showing in Figs. 2 and 5, and the same reference characters have been applied.

From the foregoing, it will be seen that I have provided control mechanism for motor vehicles with which the brakes or clutch, or both, can be actuated by fluid pressure, means being also provided to generate the desired pressure when the machine is in operation. Further, it will be apparent that with the use of this structure the same force and exercise of strength by the operator is not required, and that a light or locked setting of the brakes can be secured by variations in the movement imparted to the foot pedals controlling the air supply.

While, in the foregoing, I have described and outlined only certain specific embodiments of the present invention, it is to be understood that in practice I do not limit myself to such specific details, but may resort to any practical modifications falling within the scope of the invention as defined in the appended claims.

I claim:

1. Control mechanism for motor vehicles including with an air compressor continuously actuated during operation of the vehicle, an air cylinder to which said compressor discharges, said cylinder having an air escape opening therein opening to the atmosphere, fluid actuated means in communication with said air cylinder and connected to operate control means of the vehicle when air is supplied thereto, and means to close and partially close the air escape opening of the air cylinder.

2. Control mechanism for motor vehicles including with an air compressor continuously actuated during operation of the vehicle, an air cylinder to which said compressor discharges, said cylinder having an air escape opening therein opening to the atmosphere, fluid actuated means in communication with said air cylinder and connected to operate control means of the vehicle when air is supplied thereto, manually moved means to close and partly close the escape opening of the air cylinder to confine air to be supplied to said fluid actuated means, and means to return the parts when the manually moved means is released.

3. Control mechanism for motor vehicles including with an air compressor continuously actuated during operation of the vehicle, an air cylinder to which said compressor discharges, a cylinder connected in communication with said air cylinder, a piston mounted in said cylinder and connected with control parts of the vehicle, said air cylinder being provided with an escape opening through which air supplied thereto discharges, and a slide plate to be moved to close and partly close said escape opening.

4. Control mechanism for motor vehicles including with an air compressor continuously actuated during operation of the vehicle, an air cylinder to which said compressor discharges, a cylinder connected in communication with said air cylinder, a piston mounted in said cylinder and connected with control parts of the vehicle, said air cylinder being provided with an escape opening through which air supplied thereto discharges, a slide plate to be moved to close and partly close said escape opening, and foot operated means by which said slide plate is moved.

5. Control mechanism for motor vehicles including with an air compressor continuously actuated during operation of the vehicle, an air cylinder to which said compressor discharges, a cylinder connected in communication with said air cylinder, a piston mounted in said cylinder and connected with control parts of the vehicle, said air cylinder being provided with an escape opening through which air supplied thereto discharges, a slide plate to be moved to close and partly close said escape opening, foot operated means by which said slide plate is moved, and a spring by which said slide plate is normally moved to a position in which the air escape opening is uncovered.

In testimony whereof, I affix my signature.

GEORGE J. McCLOSKY.